(12) United States Patent
Eguchi

(10) Patent No.: US 11,174,060 B2
(45) Date of Patent: Nov. 16, 2021

(54) LAMINATION SEPARATION CONTAINER

(71) Applicant: KYORAKU CO., LTD., Kyoto (JP)

(72) Inventor: Tetsuaki Eguchi, Kanagawa (JP)

(73) Assignee: KYORAKU CO., LTD., Kyoto (JP)

( * ) Notice: Subject to any disclaimer, the term of this patent is extended or adjusted under 35 U.S.C. 154(b) by 300 days.

(21) Appl. No.: 16/333,312

(22) PCT Filed: Oct. 13, 2017

(86) PCT No.: PCT/JP2017/037261
§ 371 (c)(1),
(2) Date: Mar. 14, 2019

(87) PCT Pub. No.: WO2018/070530
PCT Pub. Date: Apr. 19, 2018

(65) Prior Publication Data
US 2019/0241303 A1    Aug. 8, 2019

(30) Foreign Application Priority Data

Oct. 14, 2016  (JP) .............................. JP2016-203013

(51) Int. Cl.
*B32B 1/02* (2006.01)
*B32B 27/30* (2006.01)
(Continued)

(52) U.S. Cl.
CPC .............. *B65D 1/0215* (2013.01); *B32B 1/02* (2013.01); *B32B 7/12* (2013.01); *B32B 27/08* (2013.01);
(Continued)

(58) Field of Classification Search
CPC .. B65D 83/0055; B65D 1/0215; B65D 77/06; B65D 77/225; B65D 23/02;
(Continued)

(56) References Cited

U.S. PATENT DOCUMENTS 6,266,943 B1 *   7/2001  Nomoto ................ G01F 11/028
                                                            53/410
2010/0221554 A1 *  9/2010  Tsubouchi ............ B29C 55/165
                                                            428/423.5
(Continued)

FOREIGN PATENT DOCUMENTS

JP        H09-110028 A    4/1997
JP         2828228 B1    11/1998
(Continued)

OTHER PUBLICATIONS

Kuraray, Eval F101B Technical Data Sheet, http://www.evalevoh.com/media/1167/F101B%20revised%202017%20Jul%2008.pdf (Year: 2008).*

(Continued)

*Primary Examiner* — Lee E Sanderson
(74) *Attorney, Agent, or Firm* — Maier & Maier, PLLC

(57) ABSTRACT

The present invention provides a delaminatable container capable of inhibiting reduction in aroma constituents of contents. According to the present invention, provided is the delaminatable container comprising an outer layer and an inner layer and having an inner bag which is composed of the inner layer and configured to contract with a decrease in the contents. The inner layer comprises, as an innermost layer, an inner EVOH layer composed of EVOH resin, and the EVOH resin contained in the inner EVOH layer has an ethylene content of equal to or less than 34 mol %.

4 Claims, 3 Drawing Sheets

(51) Int. Cl.
*B65D 1/02* (2006.01)
*B65D 23/02* (2006.01)
*B65D 77/06* (2006.01)
*B65D 83/00* (2006.01)
*B32B 27/32* (2006.01)
*B32B 27/08* (2006.01)
*B32B 7/12* (2006.01)
*B65D 65/40* (2006.01)

(52) U.S. Cl.
CPC ............ *B32B 27/306* (2013.01); *B32B 27/32* (2013.01); *B65D 1/02* (2013.01); *B65D 23/02* (2013.01); *B65D 65/40* (2013.01); *B65D 77/06* (2013.01); *B65D 83/0055* (2013.01); *B65D 83/0061* (2013.01); *B32B 2307/50* (2013.01); *B32B 2307/7244* (2013.01); *B32B 2307/732* (2013.01); *B32B 2439/60* (2013.01); *B32B 2439/70* (2013.01)

(58) Field of Classification Search
CPC .... B65D 83/0061; B65D 77/04; B65D 25/16; Y10T 428/1352; Y10T 428/13; B32B 2250/24; B32B 11/08; B32B 11/14; B32B 2439/60; B32B 2439/70; B29B 2911/1408; B29B 2911/1414; B29C 45/1646; B67D 1/0079; B67D 1/0462; B29K 2023/086; C08F 216/06; C08F 16/06
USPC ................ 222/92, 95, 105, 107; 220/495.01, 220/495.02, 495.03, 495.04, 495.05, 220/495.06, 495.07, 666, 723; 215/12.1; 428/35.7
See application file for complete search history.

(56) References Cited

U.S. PATENT DOCUMENTS

| | | | |
|---|---|---|---|
| 2016/0083581 A1* | 3/2016 | Ishii | B32B 27/34 |
| | | | 206/524.2 |
| 2017/0029156 A1* | 2/2017 | Eguchi | B65D 85/72 |
| 2017/0029157 A1 | 2/2017 | Taruno et al. | |
| 2018/0016050 A1 | 1/2018 | Eguchi et al. | |

FOREIGN PATENT DOCUMENTS

| | | | | |
|---|---|---|---|---|
| JP | 2004-196357 A | | 7/2004 | |
| JP | 2015-163531 A | | 9/2015 | |
| JP | 2016-179822 A | | 10/2016 | |
| WO | WO-2014156701 A1 | * | 10/2014 | ......... B29C 49/0031 |
| WO | 2015/080015 A1 | | 6/2015 | |
| WO | 2015/080016 A1 | | 6/2015 | |
| WO | WO-2015080016 A1 | * | 6/2015 | ............. B65D 23/02 |

OTHER PUBLICATIONS

Soarus, Soarnol DC3203RB Technical Data Sheet, http://www.b2bpolymers.com/TDS/Soarnol_DC3203RB.pdf (Year: 2013).*
Translation of International Search Report dated Nov. 28, 2017 in corresponding International Application No. PCT/JP2017/037261; 1 page.
The extended European Search Report dated Oct. 7, 2019, in connection with corresponding European Application No. 17861054.9, 8 pgs.
XP002794542 (Database WPI Week 201540 Thomson Scientific, London, GB; AN 2015-32290U), cited in NPL Cite No. 1 (3 pgs ).
XP002794543 (Database WPI Week 201538 Thomson Scientific, London, GB; AN 2015-32290W), cited in NPL Cite No. 1 (3 pgs ).
XP002794544 (Database WPI Week 199901 Thomson Scientific, London, GB; AN 1 999-002421), cited in NPL Cite No. 1 (2 pgs ).

* cited by examiner

LAMINATION SEPARATION CONTAINER

TECHNICAL FIELD

The present invention relates to a delaminatable container in which, with a decrease in contents, an inner layer is delaminated from an outer layer and an inner bag composed of the inner layer contracts.

BACKGROUND ART

There are delaminatable containers known as prior arts and capable of inhibiting entry of air into the containers (for example, PTL 1), in which, with a decrease in contents, an inner layer is delaminated from an outer layer and an inner bag composed of the inner layer contracts.

The delaminatable container disclosed in PTL 1 is configured to inhibit reduction in aroma emitted by a citrus flavor seasoning, by forming an innermost layer of the inner layer with EVOH resin.

CITATION LIST

Patent Literature

[PTL 1] JP 2015-163531A

SUMMARY OF INVENTION

Technical Problem

However, even with the delaminatable container disclosed in PTL 1, the aroma of the contents is reduced to some extent. Consequently, a delaminatable container which can further inhibit the reduction in the aroma of the contents is desired.

The present invention has been made in view of such circumstances and is to provide a delaminatable container capable of inhibiting reduction in aroma constituents of contents.

Solution to Problem

According to the present invention, provided is a delaminatable container comprising an outer layer and an inner layer and having an inner bag which is composed of the inner layer and configured to contract with a decrease in contents. The inner layer comprises, as an innermost layer, an inner EVOH layer composed of EVOH resin, and the EVOH resin contained in the inner EVOH layer has an ethylene content of equal to or less than 34 mol %.

The present inventor has made extensive investigations in order to develop the delaminatable container capable of inhibiting the reduction in citrus aroma constituents. As a result, it was found that the reduction in the aroma constituents of the contents can be significantly inhibited when the ethylene content of the EVOH resin contained in the inner most layer of the delaminatable container is equal to or less than 34 mol %, and the present invention has been completed based on this finding.

Various embodiments of the present invention are exemplified below. The embodiments below may be combined with each other.

Preferably, the ethylene content is equal to or more than 26 mol %.

Preferably, the EVOH resin contained in the inner EVOH layer has an impurity content of equal to or less than 5 mass %.

Preferably, the EVOH resin contained in the inner EVOH layer has a bending elastic modulus [MPa] of equal to or more than $0.8 \times (6600 - 86 \times (\text{the ethylene content [mol \%]}))$.

Preferably, the inner EVOH layer has a thickness of equal to or more than 21 μm.

Preferably, the inner layer comprises, as an outermost layer, an outer EVOH layer composed of EVOH resin.

Preferably, an ethylene content of the EVOH resin contained in the outer EVOH layer is equal to or more than the ethylene content of the EVOH resin contained in the inner EVOH layer.

DESCRIPTION OF EMBODIMENTS

The embodiments of the present invention are described below. Various characteristics described in the embodiments below may be combined with each other. Furthermore, each characteristic is independently inventive.

Figure 1:
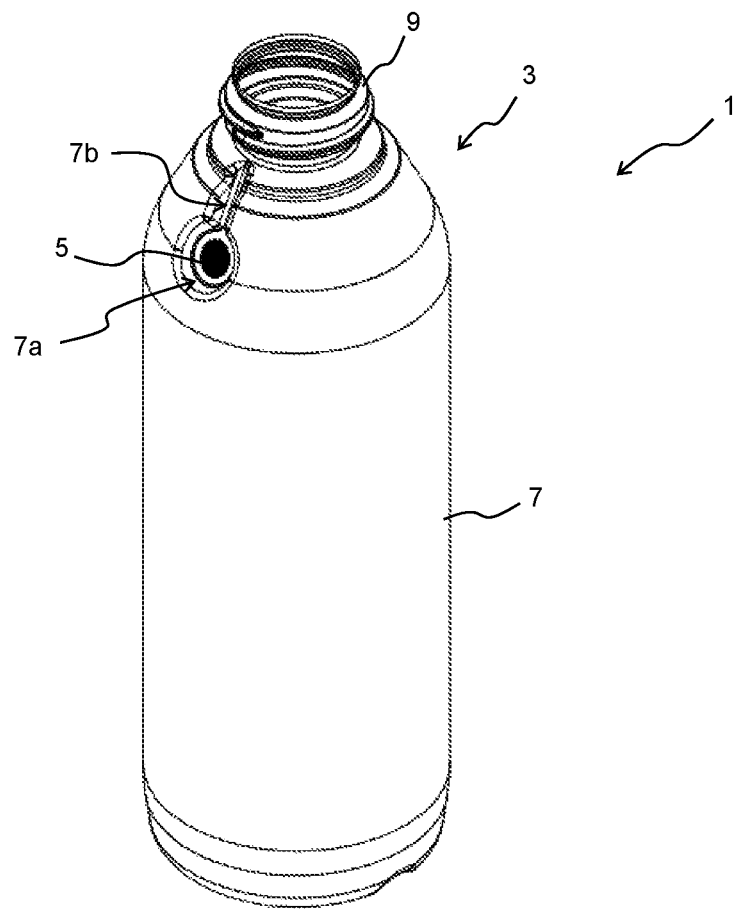
FIG. 1 is a perspective view of a delaminatable container 1 in one embodiment of the present invention.
Figure 2:
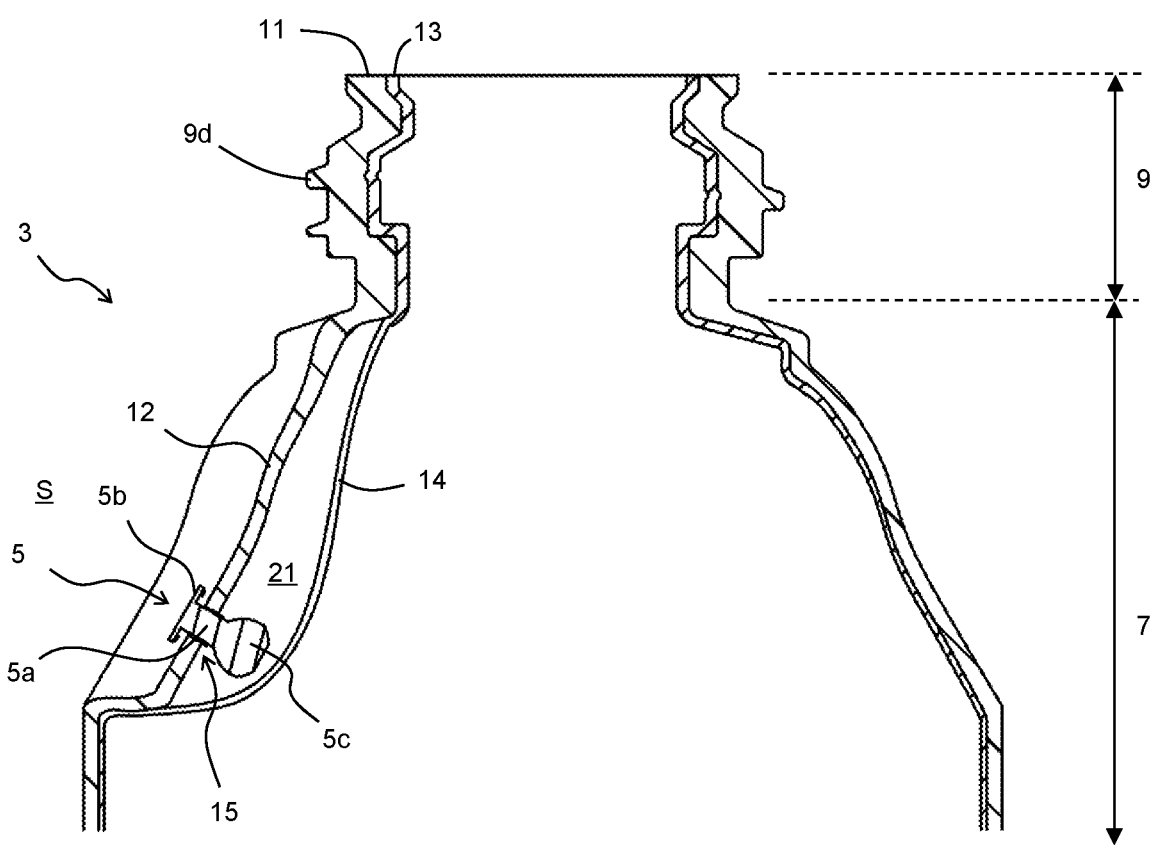
FIG. 2 is an enlarged cross-sectional view around a mouth 9 and a fresh air inlet 15 of the delaminatable container 1 illustrated in FIG. 1.
Figure 3:
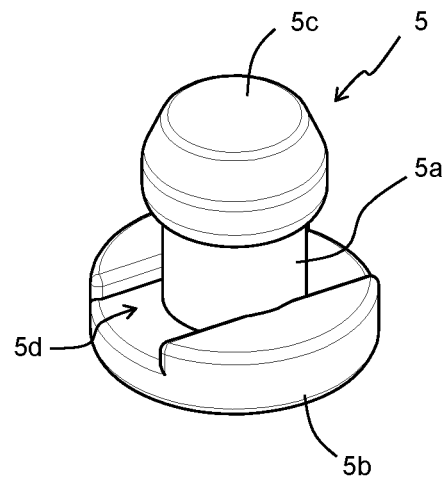
FIG. 3 is a perspective view of a valve member 5.

As illustrated in FIGS. 1 to 3, the delaminatable container 1 in one embodiment of the present invention comprises a container body 3 and the valve member 5. The container body 3 comprises a storage portion 7 to store the contents and the mouth 9 to discharge the contents from the storage portion 7.

As illustrated in FIG. 2, the container body 3 comprises an outer layer 11 and the inner layer 13 in the storage portion 7 and the mouth 9, wherein the outer layer 11 constitutes an outer shell 12, and the inner layer 13 constitutes an inner bag 14. Due to separation of the inner layer 13 from the outer layer 11 with a decrease in the contents, the inner bag 14 is separated from the outer shell 12 and contracts. In this regard, a preliminary delamination step can be performed in some cases to delaminate the inner layer 13 from the outer layer 11 before storage of the contents in the storage portion 7. In this case, the inner layer 13 is contacted with the outer layer 11 by blowing air or storing the contents in the storage portion 7 after preliminary delamination. The inner layer 13 is then separated from the outer layer 11 with a decrease in the contents. Meanwhile, when the preliminary delamination step is not performed, the inner layer 13 is delaminated and separated from the outer layer 11 in discharge of the contents.

The mouth 9 is provided with an engagement section 9d engageable with a cap having a check valve. The cap may be mounted as a press-fit cap or mounted as a screw cap.

As illustrated in FIGS. 1 and 2, the storage portion 7 is provided with a recess 7a, and the recess 7a is provided with the fresh air inlet 15. The fresh air inlet 15 is a through hole provided only in the outer shell 12 and communicates an intermediate space 21 between the outer shell 12 and the inner bag 14 with an external space S of the container body 3. Furthermore, an air circulation groove 7b which extends in a direction from the recess 7a to the mouth 9 is provided so that the recess 7a would not be tightly closed with a shrink film.

As illustrated in FIGS. 2 and 3, the valve member 5 comprises a stem 5a inserted into the fresh air inlet 15 and slidable relative to the fresh air inlet 15, a lid 5c provided on the intermediate space 21 side of the stem 5a and having a cross-sectional area larger than that of the stem 5a, and a locking portion 5b provided on the external space S side of the stem 5a and preventing entry of the valve member 5 into the intermediate space 21.

The lid 5c is configured to substantially close the fresh air inlet 15 when the outer shell 12 is compressed and has a shape of a smaller cross-sectional area as getting closer to the stem 5a. The locking portion 5b is configured to allow introduction of air into the intermediate space 21 when the outer shell 12 restores its shape after compression. When the outer shell 12 is compressed, pressure in the intermediate space 21 becomes higher than external pressure, leading to leakage of air in the intermediate space 21 from the fresh air inlet 15 to the outside. This pressure difference and air flow cause the lid 5c to move toward the fresh air inlet 15 and close the fresh air inlet 15. Since the lid 5c has the shape with a smaller cross-sectional area as getting closer to the stem 5a, the lid 5c can easily fit the fresh air inlet 15 to close the fresh air inlet 15.

When the outer shell 12 is further compressed in this situation, the pressure in the intermediate space 21 increases. As a result, the inner bag 14 is compressed to discharge the contents therein. Furthermore, when compressive force to the outer shell 12 is released, the outer shell 12 attempts to restore its shape by the elasticity of its own. At this point, the lid 5c is separated from the fresh air inlet 15 to release the closure of the fresh air inlet 15, and then fresh air is introduced into the intermediate space 21. Furthermore, the locking portion 5b is provided with a flow passage 5d so that the locking portion 5b would not close the fresh air inlet 15. Consequently, the fresh air can be introduced into the intermediate space 21 through the flow passage 5d and the fresh air inlet 15 even when the locking portion 5b abuts on the outer shell 12.

Next, a layer structure of the container body 3 is described in more detail. The container body 3 comprises the outer layer 11 and the inner layer 13.

The outer layer 11 is formed of, for example, low-density polyethylene, linear low-density polyethylene, high-density polyethylene, polypropylene, ethylene-propylene copolymer, a mixture thereof, or the like. The outer layer 11 may have a multilayer structure. The structure may be, for example, a configuration in which both sides of a repro layer are sandwiched by layers formed of a virgin material. Here, the term "repro layer" refers to a layer formed with recycled burrs generated during container molding. Furthermore, the outer layer 11 is formed thicker than the inner layer 13 so as to increase the restorability thereof. It is preferable that the outer layer 11 is composed of a random copolymer of propylene and another monomer. The monomer copolymerized with propylene may be any one that can improve impact resistance of the random copolymer in comparison with homopolymer of polypropylene, and ethylene is particularly preferable. In the case of a random copolymer of propylene and ethylene, ethylene content is preferably from 5 to 30 mol %. The weight average molecular weight of the random copolymer is preferably from 100000 to 500000, more preferably from 100000 to 300000. Furthermore, tensile modulus of the random copolymer is preferably from 400 to 1600 MPa, more preferably from 1000 to 1600 MPa. This is because shape restorability is particularly excellent when the tensile modulus is in such a range. If the container is excessively hard, the feeling when the container is used would become inferior. A flexible material, such as linear low-density polyethylene, may be thus blended to the random copolymer to configure the outer layer 11.

Figure 4:
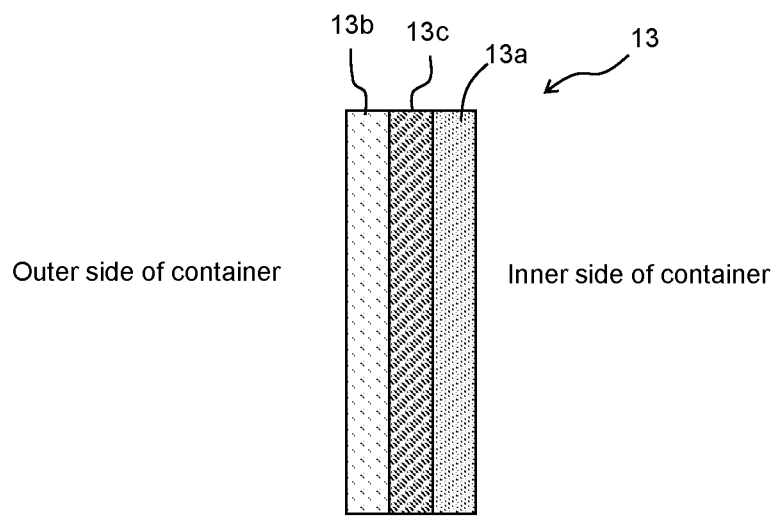
FIG. 4 is a cross-sectional view illustrating a structure of an inner layer 13.

As illustrated in FIG. 4, the inner layer 13 comprises an inner EVOH layer 13 as an innermost layer, an outer EVOH layer 13b as an outermost layer, and an adhesion layer 13c provided therebetween.

The inner EVOH layer 13a is composed of ethylene-vinyl alcohol copolymer (EVOH) resin. The EVOH resin contained in the inner EVOH layer 13a has an ethylene content E1 of equal to or less than 34 mol %, preferably 31 mol %. In this case, adsorption of the aroma constituents to an inner surface of the container is particularly inhibited. It was expected at first that the inner bag 14 would have a problem of reduced contractility due to too high rigidity of the inner EVOH layer 13a when the ethylene content E1 is equal to or less than 34 mol %. However, it was found afterward that when the contents contain moisture (more specifically, when water is the main component of the contents), the inner EVOH layer 13a absorbs water and becomes soft to inhibit the reduction in contractility of the inner bag 14 so that the inner bag 14 would be practicable. Furthermore, when the ethylene content E1 is equal to or less than 34 mol %, the rigidity of the inner EVOH layer 13a is high in a state where the inner EVOH layer 13a has not yet absorbed water. Therefore, the rigidity of the entire inner layer 13 becomes also high, and there is an advantage that the inner bag 14 is easily preliminary delaminated from the outer shell 12. In other words, by adjusting the ethylene content E1 to 34 mol % or less, the inner bag 14 is obtained which is easily preliminary delaminated before filling the contents and which easily contracts after filling the contents.

When the ethylene content E1 is too small, the rigidity of the inner EVOH layer 13a is not sufficiently lowered even after water absorption. Therefore, it is preferable that the ethylene content E1 is equal to or more than 26 mol %. Specifically, the ethylene content E1 is, for example, 26, 27, 28, 29, 30, 31, 32, 33, 34 mol %, and may be within the range between any two of the values exemplified herein.

The EVOH resin has relatively high rigidity. Therefore, when the EVOH resin is used as a material of the inner layer 13, a flexible component is usually added to the EVOH resin to improve flexibility. However, when the flexible component is added to the EVOH resin for the inner EVOH layer 13a as the innermost layer of the inner layer 13, the aroma constituents are likely to be adsorbed to the inner EVOH layer 13a. An impurity (e.g., the flexible component) content of the EVOH resin for the inner EVOH layer 13a is thus preferably equal to or less than 5 mass %, more preferably equal to or less than 1 mass %, and further more preferably equal to or less than 0.1 mass %. In this regard, examples of a form of containing the impurity include the form of blending the impurity in the EVOH resin and the form of introducing the impurity into a polymer skeleton of the EVOH resin.

It is known that the bending elastic modulus and the ethylene content are approximately in a relationship defined by Formula (1), in the EVOH resin substantially containing no flexible component. The bending elastic modulus can be measured by a test method in accordance with ISO178. The test speed is set at 2 mm/min.

bending elastic modulus [MPa]≈6600−86×(ethylene content [mol %])   Formula (1):

When the EVOH resin contains the flexible component, the actual bending elastic modulus is much smaller than the bending elastic modulus determined by Formula (1). It is preferable that the EVOH resin for the inner EVOH layer 13a contains no impurity, such as a flexible component. It is thus preferable that the bending elastic modulus of the EVOH resin for the inner EVOH layer 13a satisfies Formula (2). α in Formula (2) is a constant, for example, 0.8. Specifically, a is, for example, 0.8, 0.81, 0.82, 0.83, 0.84, 0.85, 0.86, 0.87, 0.88, 0.89, 0.9, 0.91, 0.92, 0.93, 0.94, 0.95, 0.96, 0.97, 0.98, 0.99, and 1, and may be within the range between any two of the values exemplified herein.

$$\text{bending elastic modulus [MPa]} \geq \alpha \times (6600 - 86 \times (\text{ethylene content [mol \%]}))  \quad \text{Formula (2):}$$

The EVOH resin has a high rigidity. Therefore, if the inner EVOH layer 13a is too thick, the problem arises that it is difficult for the inner bag 14 to contract smoothly when the contents are discharged. Meanwhile, if the inner EVOH layer 13a is too thin, the problem arises that the inner EVOH layer 13a is not uniformly formed, and thus the adhesion layer 13c is exposed on an inner surface of the container, or that a pinhole is easily formed in the inner EVOH layer 13a. From this viewpoint, the thickness of the inner EVOH layer 13a is from 10 to 50 μm. This thickness is preferably equal to or more than 21 μm. When the thickness of the inner EVOH layer 13a is equal to or more than 21 μm, such a configuration is preferable in that penetration of constituents of the contents into a layer adjacent to the inner EVOH layer can be inhibited more reliably. Specifically, this thickness is, for example, 10, 15, 20, 21, 25, 30, 35, 40, 45, 50 μm, and may be within the range between any two of the values exemplified herein.

The outer EVOH layer 13b is also composed of ethylene-vinyl alcohol copolymer (EVOH) resin, similarly to the inner EVOH layer 13a. There is no particular limitation regarding a thickness of the outer EVOH layer 13b, and is, for example, from 10 to 50 μm. When the outer EVOH layer 13b is too thin, a gas barrier property of the inner layer 13 would become insufficient. Meanwhile, when the outer EVOH layer 13b is too thick, the problem arises that it is difficult for the inner bag 14, due to insufficient flexibility of the inner layer 13, to contract smoothly when the contents are discharged. Specifically, this thickness is, for example, 10, 15, 20, 21, 25, 30, 35, 40, 45, 50 μm, and may be within the range between any two of the values exemplified herein.

A ratio of the thickness of the outer EVOH layer 13b/the inner EVOH layer 13a is not particularly limited, and is, for example, from 0.5 to 2. Specifically, this ratio is, for example, 0.5, 0.6, 0.7, 0.8, 0.9, 1, 1.1, 1.2, 1.3, 1.4, 1.5, 1.6, 1.7, 1.8, 1.9, 2, and may be within the range between any two of the values exemplified herein. Furthermore, by providing the outer EVOH layer 13b as the outermost layer of the inner layer 13, the delaminatability of the inner layer 13 from the outer layer 11 can be improved.

An ethylene content E2 of the EVOH resin contained in the outer EVOH layer 13b is, for example, from 25 to 50 mol %. It is preferable that the ethylene content E2 is equal to or more than the ethylene content E1. The reason is that: (1) the ethylene content E1 needs to be small in order to inhibit the adsorption of the aroma constituents to the inner EVOH layer 13a whereas the ethylene content E2 does not need to be as small as the ethylene content E1 because the outer EVOH layer 13b is not contacted with the contents; (2) since the flexibility of the outer EVOH layer 13b tends to decrease as the ethylene content E2 becomes smaller, it is preferable that the ethylene content E2 is equal to or more than the ethylene content E1. Specifically, the ethylene content E2 is, for example, 25, 26, 27, 28, 29, 30, 31, 32, 33, 34, 35, 40, 45, 50 mol %, and may be within the range between any two of the values exemplified herein. In this regard, from the viewpoint of oxygen barrier property, the ethylene content E2 is preferably as small as possible, and the ethylene contents E1 and E2 are both preferably equal to or less than 32 mol %. In particular, it is preferable that the ethylene contents E1 and E2 are both equal to or less than 29 mol %.

It is preferable that the bending elastic modulus of the EVOH resin for the outer EVOH layer 13b is less than that of the EVOH resin for the inner EVOH layer 13a. It is preferable to reduce the bending elastic modulus of the EVOH resin for the outer EVOH layer 13b by adding the flexible component thereto. The bending elastic modulus of the EVOH resin for the outer EVOH layer 13b is, for example, from 1800 to 3000 MPa. Specifically, it is, for example, 1800, 1900, 2000, 2100, 2200, 2300, 2400, 2500, 2600, 2700, 2800, 2900, 3000 MPa, and may be within the range between any two of the values exemplified herein. In particular, it is preferable, from the viewpoint of the oxygen barrier property and the contractility of the inner bag, to configure the outer EVOH layer 13b to be thicker than the inner EVOH layer 13a, and to configure the outer EVOH layer 13b to have the bending elastic modulus smaller than that of the inner EVOH layer 13a by adding the flexible component to the outer EVOH layer 13b. Furthermore, it is particularly preferable, from the viewpoint of the contractility of the inner bag, that the bending elastic modulus of the inner EVOH layer 13a satisfies above Formula (2) and that the bending elastic modulus of the outer EVOH layer 13b does not satisfy above Formula (2). In this case, the constant α in Formula (2) is set to 0.8.

The adhesion layer 13c is a layer arranged between the inner EVOH layer 13a and the outer EVOH layer 13b. The adhesion layer 13c is composed of, for example, a material prepared by adding, to the polyolefin described above, acid modified polyolefin (e.g., maleic anhydride modified polyethylene) with carboxyl groups introduced therein, or ethylene-vinyl acetate copolymer (EVA). An example of the adhesion layer 13c is a mixture of acid modified polyethylene with low-density polyethylene or linear low-density polyethylene.

The present embodiment may be carried out in the following aspects.

In the embodiment described above, the valve member 5 is configured to open and close the fresh air inlet 15 by opening and closing a gap between an edge of the fresh air inlet 15 and the valve member 5 by movement of the valve member 5. Meanwhile, the valve member itself may be provided with a through hole and a valve which can be opened and closed, and the valve member may be configured to open and close the fresh air inlet 15 by opening and closing the through hole by movement of this valve. Furthermore, the valve member may be omitted so that the fresh air inlet 15 is closed with a finger or the like when the contents are discharged.

The fresh air inlet 15 may be provided in the mouth 9, and a cap having a check valve may be used to communicate with the fresh air inlet 15.

EXAMPLES

1. Production of Delaminatable Container

The delaminatable containers were produced for Examples and Comparative Example described below.

Example 1

The delaminatable container was produced by blow molding to configure the layers as, in order from an outer side of the container, random copolymer layer (131 μm)/repro layer (351 μm)/random copolymer layer (43 μm)/outer EVOH layer (thickness of 38 μm)/adhesion layer (thickness of 43 μm)/inner EVOH layer (thickness of 30 μm). The outer EVOH layer was formed of soft-grade EVOH resin (model: Soarnol SF7503B, manufactured by Nippon Synthetic Chemical Industry Co., Ltd., ethylene content E2: 29 mol %). The inner EVOH layer was formed of general-grade EVOH resin (model: Soarnol D2908, manufactured by Nippon Synthetic Chemical Industry Co., Ltd., ethylene content E1: 29 mol %, bending elastic modulus: 4200 MPa). The adhesion layer was formed of modified polyolefin resin (trade name: Modic L522, manufactured by Mitsubishi Chemical Corporation).

Example 2

In Example 2, the delaminatable container was produced under conditions similar to Example 1, with the exception that the inner EVOH layer was formed of general-grade EVOH resin (model: Eval L171B, manufactured by Kuraray Co., Ltd., ethylene content E1: 27 mol %, bending elastic modulus: 4800 MPa).

Example 3

In Example 3, the delaminatable container was produced under conditions similar to Example 1, with the exception that the inner EVOH layer was formed of general-grade EVOH resin (model: Soarnol DC3203RB, manufactured by Nippon Synthetic Chemical Industry Co., Ltd., ethylene content E1: 32 mol %, bending elastic modulus: 4100 MPa).

Comparative Example 1

In Comparative Example 1, the delaminatable container was produced under conditions similar to Example 1, with the exception that the inner EVOH layer was formed of general-grade EVOH resin (model: Soarnol AT4403B, manufactured by Nippon Synthetic Chemical Industry Co., Ltd., ethylene content E1: 44 mol %, bending elastic modulus: 2900 MPa).

2. Evaluation of Delaminatable Container

Retention of the aroma constituents and the contractility of the inner bag were evaluated in a manner described below.

<Retention of Aroma Constituents>

The delaminatable containers of Examples and Comparative Example, and a glass bottle filled with ponzu (citrus flavor seasoning) were allowed to stand still for one week. The ponzu in the containers was then discharged, and a residual amount of the aroma constituents (ethyl acetate, pinene, myrcene, 1,3-cyclohexadiene, limonene, phellandrene, ocimene, terpinene, cymene, cyclohexene, dodecane, nonanal, acetic acid, furfural, decanal, linalool, geraniol, phenylethyl alcohol, cubenol, epiglobulol, globulol, thymol, α-cadinol) in the discharged ponzu was measured with a gas chromatograph mass spectrometer. The total of the residual amounts of the aroma constituents was then calculated to obtain the total residual amount. A residual index was calculated according to Formula (3) and evaluated according to criteria described below.

residual index=(Total Residual Amount 1/Total Residual Amount 2)   Formula (3):

Total Residual Amount 1: the total residual amount obtained for the ponzu discharged from the delaminatable containers of Examples and Comparative Example
Total Residual Amount 2: the total residual amount obtained for the ponzu discharged from the glass bottle
A: The residual index is 0.9 or more.
B: The residual index is 0.8 or more and less than 0.9.
C: The residual index is less than 0.8.

<Contractility of Inner Bag>

The shape of the inner bag of the container was evaluated by visual observation when the ponzu in the delaminatable containers of Examples and Comparative Example was discharged. The evaluation results were evaluated according to criteria described below.
A: The inner bag contracted appropriately without bending.
B: The inner bag bent and did not contract appropriately.

<Discussion>

Table 1 shows the evaluation results of the retention of aroma constituents and the contractility of the inner bag. As shown in Table 1, the contractility of the inner bag was excellent in all of Examples and Comparative Example. Furthermore, the retention of aroma constituents was excellent in all of Examples, while the reduction in the aroma constituents was relatively large in Comparative Example. Consequently, it was demonstrated that the reduction in the aroma constituents can be significantly inhibited when the ethylene content E1 is equal to or less than 34 mol %. Furthermore, it was demonstrated, by comparison between Examples 1 and 2 and Example 3, that the reduction in the aroma constituents can be further inhibited when the ethylene content E1 is equal to or less than 31 mol %.

TABLE 1

|  | Example | | | Comparative Example |
|---|---|---|---|---|
|  | 1 | 2 | 3 | 1 |
| Ethylene Content E1 of Inner EVOH Layer | 29 | 27 | 32 | 44 |
| Retention of Aroma Constituents | A | A | B | C |
| Contractility of Inner Bag | A | A | A | A |

REFERENCE SIGNS LIST

1: Delaminatable container
3: Container body
5: Valve member
5a: Stem
5b: Locking portion
5c: Lid
5d: Flow passage
7: Storage portion
7a: Recess
7b: Air circulation groove
9: Mouth
9d: Engagement section
11: Outer layer
12: Outer shell
13: Inner layer 13a: Inner EVOH layer
13b: Outer EVOH layer
13c: Adhesion layer
14: Inner bag
15: Fresh air inlet
21: Intermediate space
S: External space

The invention claimed is:

1. A delaminatable container comprising an outer layer and an inner layer and having an inner bag which is composed of the inner layer and configured to contract with a decrease in contents, wherein:

the inner layer comprises, as an innermost layer, an inner EVOH layer composed of EVOH resin and, as an outermost layer, an outer EVOH layer composed of EVOH resin, the EVOH resin contained in the inner EVOH layer has an ethylene content of equal to or less than 34 mol %, the EVOH resin contained in the inner EVOH layer has a bending elastic modulus [MPa] of equal to or more than $0.8 \times (6600 - 86 \times (\text{the ethylene content [mol \%]}))$, the bending elastic modulus being measured by a test method in accordance with ISO 178 at a test speed of 2 mm/min; and wherein an ethylene content of the EVOH resin contained in the outer EVOH layer is more than the ethylene content of the EVOH resin contained in the inner EVOH layer.

2. The delaminatable container of claim 1, wherein the ethylene content of the EVOH contained in the inner EVOH layer is equal to or more than 26 mol %.

3. The delaminatable container of claim 1, wherein the EVOH resin contained in the inner EVOH layer has an impurity content of equal to or less than 5 mass %.

4. The delaminatable container of claim 1, wherein the inner EVOH layer has a thickness of equal to or more than 21 μm.

* * * * *